May 8, 1962 O. D. WALLING ET AL 3,034,127
VARIABLE DENSITY OSCILLOGRAPHIC RECORDING APPARATUS
Filed Sept. 12, 1958
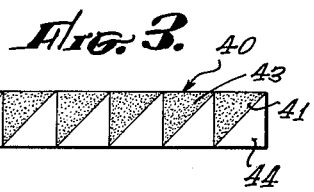
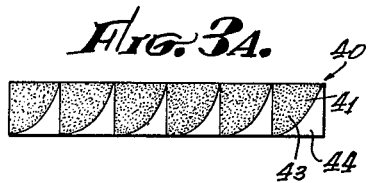
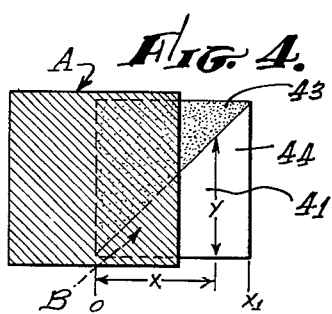
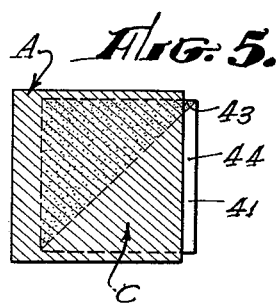
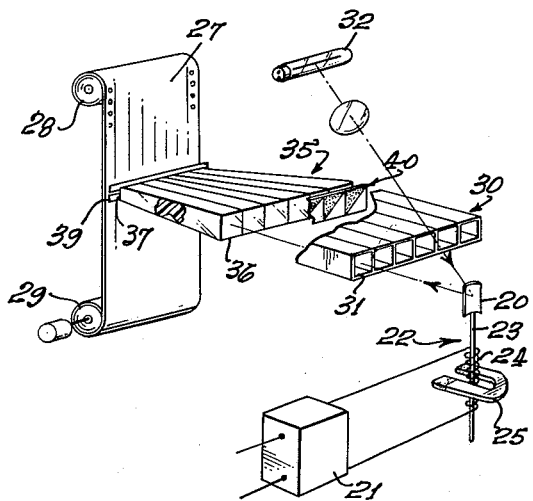
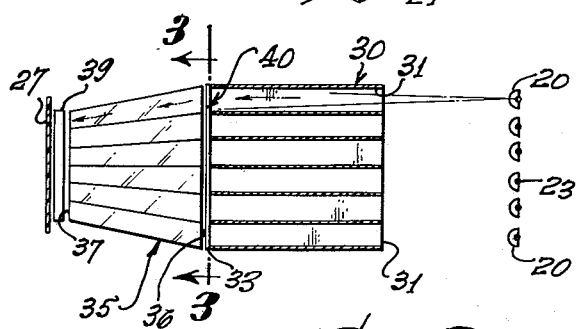
ORVILLE D. WALLING,
BEN B. THIGPEN,
INVENTORS.
BY
ATTORNEYS.

3,034,127
VARIABLE DENSITY OSCILLOGRAPHIC
RECORDING APPARATUS
Orville D. Walling, Glendale, Calif., and Ben B. Thigpen, New Orleans, La., assignors to Western Geophysical Company of America, Los Angeles, Calif., a corporation of Delaware
Filed Sept. 12, 1958, Ser. No. 760,595
4 Claims. (Cl. 346—109)

The present invention relates to apparatus for making photographic records of transient signals and more particularly, to an improved apparatus for forming a variable density time scale record of such transient signals.

In many applications, such as seismographic surveying it is necessary to record the intensity of transient signals as a time scale record, such that the intensity of an input signal is clearly discernible from the record and that the record can be viewed as a meaningful whole. Various types of records are well known to the art as are various methods and means for forming such records.

As an illustrative application of the use of such records, seismic surveying can be briefly described and the present invention will be considered in connection therewith for purposes of clarity of description only. It is to be understood that the present invention is equally applicable to other arts and fields in which a time scale record of transient signal intensity is necessary or desirable.

Briefly, in making seismographic surveys by the reflection method, a seismic disturbance is initiated at a selected point on or adjacent the earth's surface and reflected seismic waves are detected at a plurality of points spread out in a selected pattern on the earth's surface. The seismic waves are detected by sensitive instruments which convert the seismic energy to electrical signals of comparable intensity. These electrical signals are amplified and recorded on a multi-channel recording apparatus, or seismograph in this application. It is with such recording that the present invention deals.

Depending on the recording method used, the seismograph records may be of the variable amplitude type, wherein the record is produced in the form of an oscillatory line whose amplitude of oscillation is proportional to the intensity of the electrical impulses which, in turn, vary in accordance with the intensity of a reflected wave at a seismometer.

Another well-known type of seismograph record is the variable area type, wherein the width of a band of color contrasting with the background varies in proportion to the intensity of an electrical impulse produced by suitable recording instruments in response to reflected seismic waves. Other types of seismograph records are also well-known to the art, such as coded gradient recordings.

However, each of the various types of seismograph records presently known to the art has its own peculiar advantages and disadvantages. Basically, a seismograph record section should provide an overall representation of seismographic reflection energy obtained over a sequence of spread locations. In addition, it is highly desirable that a range of energy levels be recordable and measurable and that correlative events be clearly identifiable when the record section is viewed as a whole, for example, by viewing it at a distance.

Variable density recordings of the type well known to the art are particularly advantageous to discern single events and to correlate a whole record. However, prior to the present invention, suitable and accurate variable density records have been difficult to obtain. Variable density records are produced by exposing a light sensitive recording medium to light, the intensity of which is proportional to the intensity of the signal being recorded. The most common method of the prior art for obtaining such a record has been to employ a specially made lamp whose light varies in brightness in relation to the voltage input to the lamp. The disadvantages of such a system are apparent in that a number of lamps must be used for multichannel recording, their response characteristics must be uniform, the size is restricted; and the recording film must be sensitive to the particular color of light generated by the special lamps. A further disadvantage of this system is the necessity for special cameras and amplifiers in addition to those used for other types of recordings, it being advantageous to be able to produce several types of records with the same equipment.

Another method of the prior art has been to use a modulated filter to vary the intensity of the light transmitted to the film from a constant intensity source.

Other methods are known to the art but all possess certain disadvantages due primarily to the fact that balancing of light intensities and of the rates of light variation with respect to signal variation between adjacent channels is a difficult, time-consuming and frequently recurring task. The characteristics of such systems generally vary in a severe manner with time.

Accordingly, it is an object of the present invention to provide an improved means of variable density oscillographic recording.

It is another object of the present invention to provide an oscillographic variable density recording apparatus which obtains an improved density gradient of the record under control of the operator, such that the variation of signal input is more clearly discernible.

A further object of the present invention is to provide an improved variable density oscillographic recording apparatus in which compensation can be made for the exposure function and characteristics of the light sensitive recording medium.

Yet another object of the present invention is to provide a variable density recording oscillographic apparatus which can readily be biased to record only signals within a predetermined range of intensity.

A still further object of the present invention is to provide an oscillographic apparatus for recording variable density records in which the density of recordation can be predetermined for a given signal intensity.

An additional object of the present invention is to provide a multi-channel variable density recording apparatus whose channels can be readily balanced and whose balance has a greatly reduced tendency to drift with time.

The present invention is an improved variable density recording oscillographic apparatus for recording transient input signals in which a beam of light of variable area and constant and uniform intensity is converted to a beam of light of fixed area and uniform but variable intensity for recordation upon a time scale light sensitive recording medium. The variation of intensity after conversion is a function of the variation in area which is in turn a function of the magnitude of the input signal.

More specifically, a presently preferred embodiment of an improved variable density recording oscillographic apparatus in accordance with the present invention includes a moving light sensitive recording medium such as a film and a galvanometer mirror which oscillates about an axis parallel to the direction of movement of the film record. The mirror oscillates in proportion to the intensity of the input signal to be recorded. A rectangular area of light is transmitted to the mirror and reflected therefrom through a light channel to the moving film. Positioned between the light channel and the film is a light transmitting member having light diffusing properties, through which light reflected from the mirror into the channel is transmitted to the film. A light mask or aperture is positioned adjacent that end of the member through which the light from the channel enters. The light mask has an opaque portion such that the quantity of light transmitted through the member is a function of the mask.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a partially diagrammatic view in perspective of a presently preferred form of a multi-channel recording apparatus in accordance with this invention;

FIGURE 2 is a plan view of the apparatus of FIGURE 1;

FIGURES 3 and 3A are a series of light masks in accordance with this invention for the multichannel apparatus of FIGURES 1 and 2 as seen in a section taken along line 3—3 of FIGURE 2 showing variations in the masks for introducing different functions of light intensity to the film record;

FIGURE 4 is a diagrammatic view showing the area of exposure of light upon the light conductive member at a given signal intensity; and FIGURE 5 is a diagrammatic view showing the area of exposure of light upon the light conductive member at a greater signal intensity than that shown in FIGURE 4.

Referring now to the drawing there is shown in FIGURES 1, 2 and 3A partially diagrammatic representation of the recording apparatus in accordance with this invention. In FIGURE 1 a single galvanometer mirror 20 is shown in an illustrative multi-channel recorder having six channels. One mirror is shown for clarity although one will be positioned in each channel as shown in FIGURE 2.

Again using a seismographic exploration apparatus as an illustrative application of the present invention, an amplifying unit 21 is electrically connected to the detector groups, not shown, to amplify the electrical impulses produced by the detectors upon the arrival at each detector of seismographic waves generated by an explosion at the shot point and reflected by the various underground formations as discussed hereinbefore.

It is to be expressly understood that although seismographic exploration is used as an application in which the present invention is particularly desirable, it is not limited thereto and may be used in any application of an oscillographic camera in which it is desirable to obtain a variable density record of oscillatory signals.

The intensity of the electrical signal is transmitted from the detector group or other signal source through the amplifier to a galvanometer 22, of the type well known to the art, where it is impressed across the wire loop 24 of the galvanometer 22 to which a mirror is affixed and which is disposed in the field of a permanent magnet 25. Thus, the mirror 20 is rotated about a vertical axis by an amount proportional to the electrical impulse received at the galvanometer which is, in turn, proportional to the input signal, or in this illustration, in accordance with a reflected shock wave received at an individual detector group.

Referring now particularly to FIGURES 1 and 2, a plurality of oscillating mirrors 20, equal in number to the number of channels in the oscillographic camera are arranged in side by side relationship. Each mirror 20 is affixed to a vertical shaft 23 which is in turn affixed to the movable coil 24 of a galvanometer 22. The coil of each galvanometer is rotated within the permanent magnet 25 by an amount proportional to the electrical signal impressed upon it. In the embodiment shown in FIGURE 1, six channels are shown thereby providing a multi-channel oscillographic camera in which six signals are recorded simultaneously in side by side relationship upon a six channel photographic record. The electrical signal transmitted to each galvanometer causes the respective mirror 20 to be rotated about a vertical axis through an arc which is proportional to the electrical signal impressed upon the coil and which will vary with varying intensity of the signal. The galvanometer and mirror are of the type well known to the art and are not shown or described in detail. The mirror, however, is preferably spherical to transmit a light band as described hereinafter.

Although a multi-channel oscillographic camera and recording system are described in detail throughout the specification, it is to be understood that the present invention may also be utilized in a single channel oscillographic camera.

The light sensitive recording medium such as photographic film 27 is positioned in a vertical plane substantially parallel to the plane of the vertical axes of the galvanometers 22 and at a substantial distance therefrom. The photographic film is mounted on an idler roll 28 and a driven roll 29 which is driven by a motor to move the film at a constant rate of speed in the vertical plane. The means for mounting and moving the photographic film are well known to the art.

A light source 32 is positioned with respect to the mirrors 29 such that light transmitted to the mirrors is reflected toward the respective channel of the record. Thus, in this embodiment the light source 32 is positioned above the line of the mirrors 20 between the mirrors and the film 27. The light source is of the type which furnishes a band of light and is oriented horizontally with respect to the orientation of the apparatus. That is, a broad line filament lamp 32 of the type well known to the art is used in this embodiment and is oriented to transmit a horizontal band of light to the mirrors 20.

A light channelizer 30 is positioned between the mirrors 20 and the film 27 in the path of the light reflected from the mirror. The channelizer comprises a series of opaque-walled channels 31 so oriented that light transmitted from a given mirror can pass through only its respective channel. Thus, from the film end 33 of a given channel 31 only the mirror 20 corresponding to that channel can be "seen."

Positioned between the channel 31 and the film 27 there is a light conducting member 35 in accordance with this invention. A light member 35 is positioned in each of the channels as shown in the figures and all are similar except that the geometry of each will vary in connecting the end 33 of the channelizer 30 to the narrower width of the film strip 27. The light member 35 is formed of light conducting material of the type well known such as methyl methacrylate resin, known by the trademark Lucite of E. I. du Pont de Nemours and Co. or acrylate and methacrylate resin, known by the trademark Plexiglas of Rohm and Haas Co., Inc. Each of the members 35 is of rectangular cross-sectional configuration which decreases along all sides of the rectangle from the channelizer end 36 to the film end 37 of the member. That is, the end area of each member at the light receiving end or channelizer end 36 is substantially equal to the area and configuration of the respective channel 31, while the light transmitting end or film end 37 is equal to the width of the channel on the film 27. The members 35 are convergent from the width of the channelizer to the width of a channel of the film while the height of each member is convergent from the height of the channelizer to a height convenient to the optical system at the film and the longitudinal geometry of each is determined accordingly. The light conductive member 35 will accordingly transmit light from the respective channel 31 of the channelizer 30 to the proper position on the film strip. In order to effect maximum transmission of light from the channel 31 to the film and to assure light transmission from only the proper channel, each of the light members 35 is isolated from the others by thin spacers or shims. Such spacers or shims are used as required by the configuration or geometry of the light members to prevent adjacent members from coming into contact with each other. In the present embodiment spacers are used at the film end 37 of the light members where the said members should be held tightly together.

Means are provided in the light conductive members 35 for diffusing light which passes through the member. In the presently preferred embodiment the channelizer end of the member 35 is frosted such that all light passing through the channelizer end of the member is diffused so as to be scattered through the entire cross-section of the member. The film end in this embodiment is polished to allow maximum light transmission. Thus, light admitted at the channelizer end 36 of the member 35 is emitted from the film end 37 as a beam of light having a cross-sectional configuration equal to the configuration of the film end 37 of the member. A slit mask 39 is positioned between the light conductive members 35 and the moving film 27 to reduce the light beam from each member 35 to substantially a horizontal line of light. Alternatively, the light conducting members 35 may be tapered to a relatively narrow horizontal strip at the film end 37 and a condensing lens may be used in place of, or with the mask. The intensity of the line of light transmitted to the moving film record is accordingly determined by the amount of light admitted to the channelizer end 36 of the member.

In accordance with the present embodiment of this invention the means for varying the area of the light beam transmitted to the film record comprises a series 40 of opaque masks 41 positioned between the channelizer 30 and the series of light conductive members 35 such that an identical mask is positioned over the light receiving or channelizer end 36 of each member 35. The configuration of the mask 41 is determined by factors discussed hereinafter, but in general terms it is an aperture so formed that a portion of the end 37 of the member is closed to the admission of light. Referring to FIGURES 1, 3, 3A, 4 and 5 a portion 43 of the end area of each member is rendered opaque while the remaining area 44 is left open to the passage of light.

Although the embodiment of this invention which is illustrated herein is so constructed that the direction of motion of the photographic recording medium is in a plane parallel to that defined by the axes of the several galvanometers, it is often convenient to use another relative orientation by suitably bending or contorting the light-conducting members so that their film ends lie along a line parallel to the recording medium and across the direction of motion of the film. The light conducting members may also be individually displaced at the film end from a line perpendicular to the direction of motion of the recording medium in order to effect time origin corrections.

In order to illustrate the determination of the mask configuration and its mode of operation a straight line mask is shown in connection with the apparatus of the drawing. From the foregoing it will be seen that a signal transmitted to the galvanometer 22 in FIGURES 1 and 2 will cause the mirror 20 to rotate clockwise by an amount proportional to the signal intensity. As the signal intensity reaches a predetermined level the broad vertical band of light A is reflected by the mirror 20 and enters the respective channel 31 at the left side thereof. Referring now to FIGURE 4, since the mirror 20 has been rotated only by an amount sufficient to bring a portion of the broad band of light into the channel only the left portion of the end 37 of the member 35 and mask 41 are exposed to light. The amount of light admitted to the light conductive member for transmission to the film end 37 is accordingly determined by the area of the triangle of light B striking the light passing area 44 of the end 36. Referring now to FIGURES 1 and 5, as the signal intensity to the galvanometer 22 increases the mirror is rotated further clockwise and the light passing through the channel 31 covers a greater portion of the end face 36 of the member 35. The amount of light transmitted through the member 35 is, however, increased by a much greater proportion than the increase of the end face which is covered since the area of the light passing triangle C is four times as great as the area of the light passing triangle B if the total area of the beam passing through the channel 31 is twice as wide.

From the above it may be seen that the light passing area defined by the mask 41 can be varied to obtain any desired function of the intensity of light reaching the film. Thus, as shown in FIGURE 3A the area 44 can be defined by an exponential curve which causes the light transmitted to the film to increase exponentially in intensity. In practice it has been found to be highly desirable to determine the mask such that intensity of light transmitted to the film is correlative with the exposure function of the film.

The correlation of the light intensity transmitted to the film with the exposure function of the film can be determined by one skilled in the art, however, a generalized computation of such correlation is given below. The range of signal voltage $v$ to be recorded is defined to be between $v_0$ as a minimum and $v_1$ as a maximum. Referring to FIGURE 3, the coordinates $x$ and $y$ of the mask are shown. It is assumed herein that the light area is greater in height and width than the receiving end of the light conductive member. If this is not true the following equations must be modified in a manner obvious to one skilled in the art.

The bias or mechanical setting of the galvanometer of the apparatus and the gain of the amplifier are adjusted such that $$x_1 = g(v_1 - v_0)$$
$$x = g(v - v_0)$$

where $g$ is a predetermined constant set by the gain of the apparatus such that $g = x_1/(v_1 - v_0)$.

The bias or mechanical setting of the apparatus is adjusted to set the right edge of the light beam at $x=0$ when $v=v_0$.

Accordingly, the light transmitted L for given voltage v., where $v_0 \leq v \leq v_1$ is given by $$L = a\int_0^x y\,dx = ag\int_{v_0}^v y\,dv \qquad (1)$$

Further, the darkness D of the film is related to the light intensity by a functional relationship peculiar to the film and by a multiplicative constant $b$ related to the properties of the light conducting member and optical system of the apparatus. Thus:

$$D = f(bL) \qquad (2)$$

Since for most photographic materials, this function is uniform, Equation $b$ can be written $$bL = f^{-1}(D) = F(D) \qquad (3)$$

and by substitution of (3) into (1), $$F(D) = agb\int_{v_0}^v y\,dv \qquad (4)$$

The function $f(bL)$ and its inverse $F(D)$ are obtainable from the manufacturer of the film and the constants $a$, $g$, and $b$ are readily determined by routine measurement of the apparatus. In utilizing the present invention a relationship of light intensity to signal intensity will be specified as $D = H(v)$ where H is the variable density function for a given signal voltage v. The mask is then designed by calculating $y = y(x)$.

The equations to derive $f(x)$ are as follows:

$$H(v) = D = f(bL) = f\left(agb\int_{v_0}^v y\,dv\right)$$

so $$F[H(v)] = agb \int_{v_0}^{v} y\,dv$$

and $$F[H(v)]/(agb) = \int_{v_0}^{v} y\,dv$$

whence $$\frac{d}{dv}\{F[H(v)]/(agb)\} = y(v-v_0) = y(x/g)$$

In an application where no mask is used $y=k$, a constant, and $$L = akx;\ D = f(bL) = f(bakx) = f[bakg(v-v_0)]$$

Thus, there has been described an improved apparatus for forming a variable density time scale record of transient input signals.

What is claimed is:

1. An oscillographic camera for recording a variable density, time scale record of a plurality of transient input signals comprising: a fixed light source; a photographic recording medium adapted to be moved, means for moving said medium at a substantially constant rate; a galvanometer mirror, said mirror being oscillated about an axis in response to an input signal, the extent of oscillation being determined by the magnitude of said input signal; means for directing an area of light from said source onto said mirror, said light being oriented such that it is reflected in a path to said film; means for channelizing said path; a light conducting and diffusing member positioned in said channelized light path, said member being a solid elongate member of light transmitting and diffusing material with a first end face toward the respective one of said mirrors and a second end face proximate said recording medium, said first face having a width substantially equal to the width of said channelizing means and positioned adjacent thereto, said second end face having a width substantially equal to the width of the recording channel on said recording medium; said mirror, light source and member being so constructed and arranged that said area of light is moved in position relative to said first end face of said member such that rotational movement of said mirror causes different portions of said area of light to pass onto portions of said face, said portions being determined by the rotational position of said mirror in response to said signal.

2. A multi-channel oscillographic camera for recording a variable density, time scale record of a plurality of transient input signals comprising: a fixed light source, a photographic recording medium adapted to be moved, means for moving said medium at a substantially constant rate; a plurality of galvanometer mirrors, each of said mirrors being oscillated about an axis in response to a respective input signal, the extent of oscillation being determined by the magnitude of the respective transient input signal, each of said mirrors being oriented in a channel of said apparatus; means for directing an area of light from said source onto each of said mirrors, said light being oriented such that it is reflected in a plurality of paths to said film; means for channelizing said paths; a light conducting and diffusing member positioned in each of said channelized light paths, each of said members being a solid elongate member of light transmitting and diffusing material with a first end face toward the respective one of said mirrors and a second end face proximate said recording medium, said first face having a width substantially equal to the width of said channelizing means and positioned adjacent thereto, said second end face having a width substantially equal to the width of the recording channel on said recording medium; said mirrors, light source and members being so constructed and arranged that said area of light is moved in position relative to said first end face of said member such that rotational movement of said mirror causes different portions of said area of light to pass onto portions of said face, said portions being determined by the rotational position of said mirror in response to said signal.

3. A multi-channel oscillographic camera for recording a variable density, time scale record of a plurality of transient input signals comprising: a fixed light source, a photographic recording medium adapted to be moved, means for moving said medium at a substantially constant rate; a plurality of galvanometer mirrors, each of said mirrors being oscillated about an axis in response to a respective input signal, the extent of oscillation being determined by the magnitude of the respective transient input signal, each of said mirrors being oriented in a channel of said apparatus; means for directing an area of light from said source onto each of said mirrors, said light being oriented such that it is reflected in a plurality of paths to said film; means for channelizing said paths; a plurality of light conducting and diffusing members in juxtaposed relationship with each of said members positioned in a respective one of said light channels, each of said members being an elongate solid member of light transmitting material with a first end face toward the respective one of said mirrors and a second end face proximate said recording medium, said member being of rectangular cross-sectional configuration of decreasing area from said first to said second end, said first end face being positioned adjacent said channelizing means and having a cross-sectional area corresponding thereto, said second end face being of substantially lesser cross-sectional area than said first end face and having a width substantially equal to the width of the recording channel on said recording medium; said mirrors, light source and members being so constructed and arranged that said area of light is moved in position relative to said first end face of said member such that rotational movement of said mirror causes different portions of said area of light to pass onto portions of said face, said portions being determined by rotational position of said mirror in response to said signal.

4. A multi-channel oscillographic camera for recording a variable density, time scale record of a plurality of transient input signals comprising: a fixed light source, a photographic recording medium adapted to be moved, means for moving said medium at a substantially constant rate; a plurality of galvanometer mirrors, each of said mirrors being oscillated about an axis in response to a respective input signal, the extent of oscillation being determined by the magnitude of the respective transient input signal, each of said mirrors being oriented in a channel of said apparatus; means for directing an area of light from said source onto each of said mirrors, said light being oriented such that it is reflected in a plurality of paths to said film; means for channelizing said paths; a plurality of light conducting and diffusing members in juxtaposed relationship with each of said members positioned in a respective one of said light channels, each of said members being an elongate solid member of light transmitting material wtih a first end face toward the respective one of said mirrors and a second end face proximate said recording medium, said member being of rectangular cross-sectional configuration of decreasing area from said first to said second end, said first end face being positioned adjacent said channelizing means and having a cross-sectional area corresponding thereto, said second end face being of substantially lesser cross-sectional area than said first end face and having a width substantially equal to the width of the recording channel on said recording medium; a light mask positioned adjacent said first end face of each of said light conducting and diffusing members, each of said light masks being similar in configuration and defining an aperture whereby the quantity of light entering each of said members is a function of said mask; said mirrors, light source and members being so constructed and arranged that said area of light is moved in position relative to said first end face of said member such that rotational movement of said mirror causes different portions of said area of light to pass through said aperture and onto portions of said face, said portions being determined by the rotational position of said mirror in response to said signal.

References Cited in the file of this patent

UNITED STATES PATENTS

| | | |
|---|---|---|
| 2,381,980 | Offner | Aug. 14, 1945 |
| 2,426,367 | Maurer | Aug. 26, 1947 |
| 2,437,411 | Tuttle | Mar. 9, 1948 |
| 2,540,105 | Dunbar et al. | Feb. 6, 1951 |
| 2,769,683 | Skelton | Nov. 6, 1956 |
| 2,840,441 | Owen | June 24, 1958 |